(12) United States Patent
Palmius

(10) Patent No.: US 7,225,603 B2
(45) Date of Patent: Jun. 5, 2007

(54) NUMNAH FOR INTERPOSITION BETWEEN A SADDLE AND AN ANIMAL TO BE RIDDEN

(76) Inventor: Billy Palmius, Storgatan 30A SE-667 30, Forshaga (SE)

( * ) Notice: Subject to any disclaimer, the term of this patent is extended or adjusted under 35 U.S.C. 154(b) by 0 days.

(21) Appl. No.: 10/532,494

(22) PCT Filed: Oct. 28, 2003

(86) PCT No.: PCT/SE03/01668

§ 371 (c)(1),
(2), (4) Date: Aug. 30, 2005

(87) PCT Pub. No.: WO2004/037709

PCT Pub. Date: May 6, 2004

(65) Prior Publication Data

US 2006/0150585 A1    Jul. 13, 2006

(30) Foreign Application Priority Data

Oct. 28, 2002  (SE) .................................. 0203178

(51) Int. Cl.
*B68C 1/12* (2006.01)
(52) U.S. Cl. .......................................... 54/66; 54/44.5
(58) Field of Classification Search ............... 54/66, 54/44.5, 41.1, 65, 79.3, 79.4, 79.1
See application file for complete search history.

(56) References Cited

U.S. PATENT DOCUMENTS

| | | | | |
|---|---|---|---|---|
| 4,695,496 A | * | 9/1987 | Lee | 428/95 |
| 4,974,397 A | * | 12/1990 | Ricken | 54/66 |
| 5,104,910 A | * | 4/1992 | Turner et al. | 521/163 |
| 5,363,631 A | * | 11/1994 | Garrison | 54/66 |
| 5,575,139 A | * | 11/1996 | Green | 54/66 |
| 6,050,067 A | * | 4/2000 | Knight et al. | 54/44.6 |
| 6,459,015 B1 | | 10/2002 | Lyon | |
| 2002/0041949 A1 | * | 4/2002 | Nishibori et al. | 428/86 |
| 2002/0162307 A1 | * | 11/2002 | Arnold | 54/66 |

FOREIGN PATENT DOCUMENTS

| | | | |
|---|---|---|---|
| EP | 0078657 A2 | * | 5/1983 |
| EP | 0555568 A1 | | 8/1993 |
| EP | 1283191 A2 | | 2/2003 |
| GB | 1221444 | * | 2/1971 |
| GB | 1247797 A | | 2/1974 |
| WO | WO 9315998 A1 | | 8/1993 |
| WO | WO 0110772 A1 | | 2/2001 |

* cited by examiner

*Primary Examiner*—Son T. Nguyen
(74) *Attorney, Agent, or Firm*—Jeffrey S. Melcher; Manelli Denison & Selter, PLLC

(57) ABSTRACT

The invention relates to a numnah for interposition between a saddle and an animal to be ridden. The numnah comprises a first layer that constitutes a base layer of polymer foam with an open cell structure and a second layer in the form of a cover fabric with an open structure intended to be applied against the back of the animal to be ridden. The base layer substantially consists of polyurethane foam and at least 50% recycled polyurethane foam with a high water absorption capacity. A suitable material may be a Poliyou® foam.

20 Claims, 3 Drawing Sheets

NUMNAH FOR INTERPOSITION BETWEEN A SADDLE AND AN ANIMAL TO BE RIDDEN

FIELD OF THE INVENTION

The present invention relates to a numnah/saddle pad for interposition between a saddle and the back of an animal to be ridden, e.g. a horse or a donkey.

BACKGROUND OF THE INVENTION

Numnahs are used as interlinings between a saddle and the back of an animal to be ridden. The function of the numnah is mainly to spare the back of the animal from direct contact with the saddle and to distribute the pressure from the weight of the rider evenly over the back of the animal. The numnah also protects the saddle from sweat that emanates from the body of the animal being ridden. Therefore, a numnah should have such mechanical properties that it can have a shock-absorbing function and also distribute force and weight. The numnah must not be to stiff but neither can it be too soft. Preferably, the numnah shall also permit a certain amount of ventilation since a numnah that is airtight causes the animal being ridden to produce more heat and sweat. This can be very uncomfortable for the animal being ridden. Moreover, the numnah must lie close on the back of the animal being ridden and not glide too easily against the back of the animal. It has been suggested in e.g. WO 93/15998 that, in order to prevent slipping between the numnah and the back of the animal, a numnah can be provided with a friction surface facing the back of the animal being ridden. In WO 01/10772, a numnah is disclosed that comprises a base layer made of polyvinyl chloride with an open cell structure. According to the above indicated WO 01/10772, a suitable material may be a material sold under the name "GALFOAM Metallocene Foam GM300" that is said to be available from Palziv in Israel. This numnah also comprises a scrim layer having a non-slip surface which may be juxtaposed the back of the animal to be ridden. The scrim layer comprises a planar polymer foam matrix configured to provide a plurality of open air pockets extending to the base layer.

It is an object of the present invention to provide a numnah having such mechanical properties that it may distribute the weight of the rider gently over the back of the animal to be ridden. It is a further objective of the invention to provide a numnah with a high permeability to air and thereby a good ventilating effectiveness. Moreover, it is an object of the invention to provide a numnah that has a good capacity for taking care of sweat from the animal being ridden.

DESCRIPTION OF THE INVENTION

The present invention relates to a numnah for interposition between a saddle and an animal to be ridden. The inventive numnah comprises a first layer that constitutes a base layer made of polymer foam with an open cell structure and a second layer in the form of a cover fabric with an open structure that will face the back of the animal when the numnah is placed on an animal to be ridden. The base layer is made of polyurethane foam and comprises at least 50% recycled polyurethane foam. The base layer preferably has a hardness of 10–35 (Asker type C). The thickness of the numnah is suitably in the range of 2–20 mm and preferably in the range of 4–12 mm. For example, a suitable thickness may be 6 mm. The base layer preferably has a water absorption capacity of at least 300% by weight. Preferably, the base layer has a water absorption capacity of at least 500% by weight.

Preferably, the base layer contains activated carbon. The permeability to air is 150–300 l/m²sec. The numnah has an edge and at least a part of the edge is suitably curved inwardly.

A material that is very suitable for the base layer is Poliyou®.

DETAILED DESCRIPTION OF THE INVENTION

Figure 1:
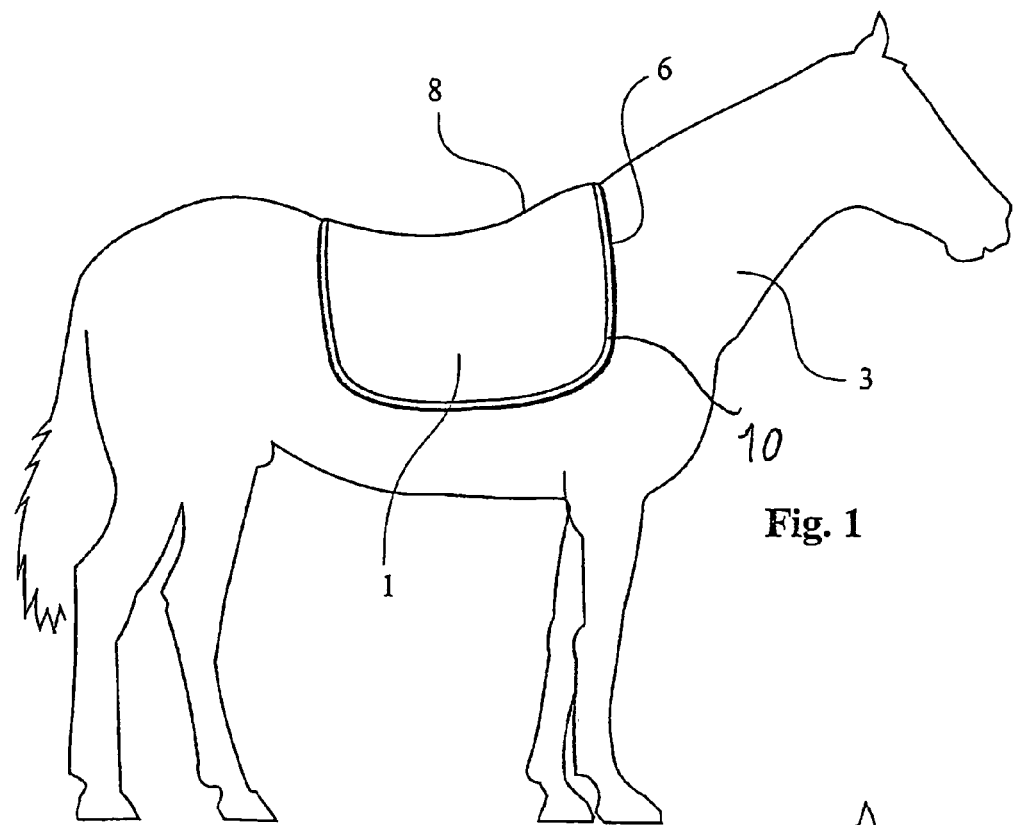
FIG. 1 shows a numnah placed on the back of an animal to be ridden.
Figure 2:
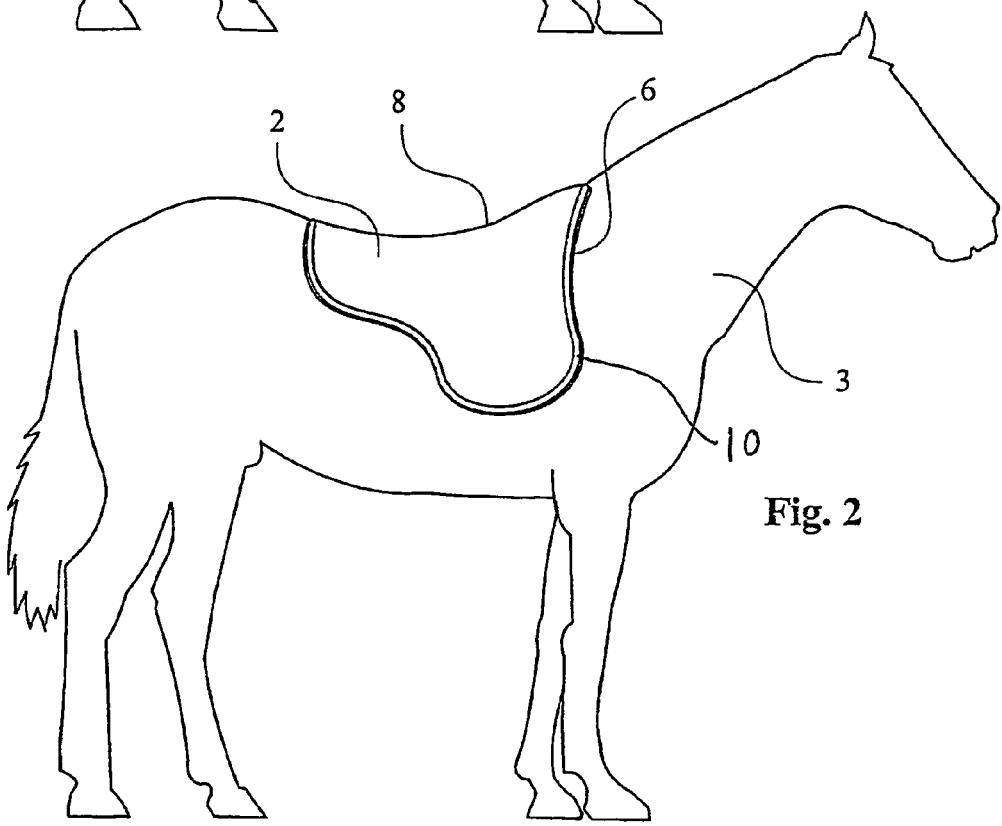
FIG. 2 shows a numnah of a somewhat different shape.

In FIG. 1, a numnah 1 is showed applied on the back of an animal 3 to be ridden. In FIG. 2, a different kind of numnah 2 is showed as being positioned on the back of an animal 3 to be ridden. A numnah may sometimes be shaped as the numnah 2 in FIG. 2 in order to save material. The numnah 1, 2 is curved in two directions—i.e. it has a saddle shape—and is thus formed with a curvature or curved section 8 that is adjusted to the longitudinal curvature of the back of an animal 3 to be ridden. As can be seen from FIG. 3, the numnah is also curved in the cross direction with a curvature 7. The present invention relates to a numnah 1, 2 for interposition between a saddle and an animal to be ridden 3. From FIG. 4, it can be seen how the inventive numnah 1, 2 comprises a first layer 4 that constitutes a base layer 4 of polymer foam having an open cell structure and a second layer 5 in the form of a cover fabric 5 which will face the back of the animal 3 to be ridden. A thin outer layer 9 is facing outwardly, away from the animal 3 to be ridden. The cover fabric 5 can suitably be a layer of knitted polyester with an open structure to allow air and sweat to pass through The base layer 4 is substantially made of polyurethane foam and it comprises at least 50% recycled polyurethane foam. The base layer 4 has a hardness of 10–35 (Asker C). The thickness of the numnah 1, 2, may suitably be in the range of 2 mm–20 mm and preferably in the range of 4 mm–12 mm. The thickness of 2–20 mm or 4–12 mm includes the combined thickness of the base layer 4, the cover fabric 5 and the thin outer layer 9. The outer layer 9 is made stretchable in order for it to be formable. The greatest part of the total thickness comes from the base layer 4 while the thickness of the cover fabric 5 and the thin outer layer 9 is almost negligible or very small compared to the thickness of the base layer 4. The base layer 4 further has a water absorption capacity of at least 300% by weight. Preferably, the base layer 4 has a water absorption capacity of at least 500%. The cover fabric 5 preferably constitutes a non-slip inner layer. The cells of the base layer 4 are preferably open in such a way as to provide open channels straight through the base layer 4 in order to provide good permeability for air and liquid.

The base layer 4 preferably contains activated carbon and it preferably has a permeability to air in the range of 150–300 l/m²sec. The activated carbon reduces odour and contributes to counteract or limit bacteria and fungus. In addition, the base layer may have biocides to kill bacteria and fungus.

A material that is particularly suitable for the base layer 4 is the material sold under the name Poliyou® and is sold by Kun Huang Enterprise Corporation. In the context of this patent application, Poliyou® material may in particular be understood as such a polymer foam that is manufactured according to the method specified in the European published patent application No. 92301089.6 with publication number EP 0 555 568 A1 and entitled "Process for making a foam material". This European patent corresponds to U.S. Pat. No. 5,204,040. In the European patent publication 0 555 568 A1, a process is described where a polymer foam is made through a method that comprises the use of recycled foam where a previously formed foam material is comminuted into particles. The particles are dried to dried particles which can be made in an oven at a temperature of 150° C. The dried particles are then impregnated with a first foaming reaction solution that may be made up of a polyol, a catalyst and additives in a predetermined ratio. In this way, first impregnated particles are obtained. The first impregnated particles are then rolled and pressed so as to obtain rolled particles. The rolled particles are then mixed with a second foaming reaction solution so as to obtain second impregnated particles. The second foaming reaction solution may comprise TDI (tolylene-diisocyanate) and 60% of polyol by weight. The second impregnated particles are then subjected to steam. Thanks to this method of manufacturing, one gains, for example, the advantage of a high air permeability. The specification of EP 0 555 568 is incorporated herein by reference and the applicant reserves the right to further define the present invention by adding to the claims such limitations or technical information that may be found in EP 0 555 568 A1.

Poliyou® material is commercially available in Sweden from Teges Jerndahls Skinn & Läder with the address Gesällgatan 3, Box 66, SE-692 22 KUMLA. In Sweden, Poliyou® material can also be obtained from Abesko AB, P.O. Box 1642, SE-701 16 ÖREBRO.

Poliyou® is made from polyurethane and it typically comprises 50–70% recycled polyurethane. The material contains millions of tiny air bubbles and it is therefore very light. Poliyou® material contains activated carbon. Suitably, it may contain about 5% activated carbon. That the base layer 4 of the numnah 1, 2 contains activated carbon gives the advantage that unpleasant smell can be absorbed. In addition to activated carbon, Poliyou® material may comprise biocides to kill bacteria and fungus. If biocides are used, one gains the advantage that unpleasant smell can be avoided. Additionally, the risk of irritating the back of the animal being ridden is decreased.

In tests, Poliyou® foams with a suitable thickness have been found to have an air permeability of 200 l/m² sec which must be regarded as a good value. High air permeability confers the advantage that ventilation is improved and the animal being ridden will sweat less.

In comparative tests where Poliyou® foams have been tested together with other foam materials, it has been found that Poliyou® foams have a very high water absorption capacity. Tests have shown that a piece of Poliyou® foam was capable of absorbing water up to 320% of its own weight and the absorption time was only 15 seconds. A different polyurethane foam (not Poliyou®) that was also tested could only absorb water up to 64% of its own weight and the absorption time was 45 seconds.

The same test was also performed on a variant of Poliyou® foam that is sold under the name Hydro-Poliyou® and that currently—in October 2002—is sold by Kun Huang Enterprise Corporation in Taiwan. It was found that Hydro-Poliyou® was capable of absorbing water up to 522% of its own weight and the absorption time was only 6 seconds. Hydro-Poliyou® is also available in Sweden from Teges Jerndahls Skinn & Läder with the address Gesällgatan 3, Box 66, SE-692 22 KUMLA.

It was also found that Poliyou® foams, especially Hydro-Poliyou® foams, have a superior desorption capacity. In order to determine whether Poliyou® foam is s suitable material for a numnah, the inventor of the present invention has made comparative tests between a numnah made of Poliyou® material and numnahs made of other materials. The other numnahs tested included a numnah made of a cotton material and a numnah made of a polyester material. The testing was made by using different numnahs during riding. The animal being ridden was a horse. The comparative tests yielded the following results. The subjective experience during riding was that the Poliyou® numnah resulted in a better distribution of pressure and a softer and gentler feeling than what was experienced when the other numnahs were used. Visual inspection after riding revealed that the horse was clearly less sweaty after use of the Poliyou® numnah compared to what was experienced when the other numnahs were used. Finally, it was also found that some days after riding, the Poliyou® numnah smelled much less than the other numnahs. One Poliyou® numnah that was used for testing had a hardness of 25 (Asker C) and a thickness of 6 mm. It was found that this numnah could distribute pressure very effectively over the body of the animal being ridden.

That less sweat was produced can be partially explained by the high air permeability but an additional important reason is the high liquid absorption capacity of Poliyou®.

Poliyou® foam is commercially available in different qualities. In Sweden, Poliyou® foams are currently (October 2002) available in at least three different qualities: Poliyou® 10D, Poliyou® 25D and Poliyou® 35D where the numbers indicate hardness (Asker Type C). During tests, it has been found that a Poliyou® 10D foam is not as stiff as would be desirable for a numnah even though other qualities such as water absorption and air permeability are very good. However, it has been found that a Poliyou® 25D foam has good mechanical properties and is especially well suited for a numnah. It is also possible to use a Poliyou® 35D foam but it has been discovered during testing that a Poliyou® 35D foam is stiffer than what is preferable.

Figure 3:
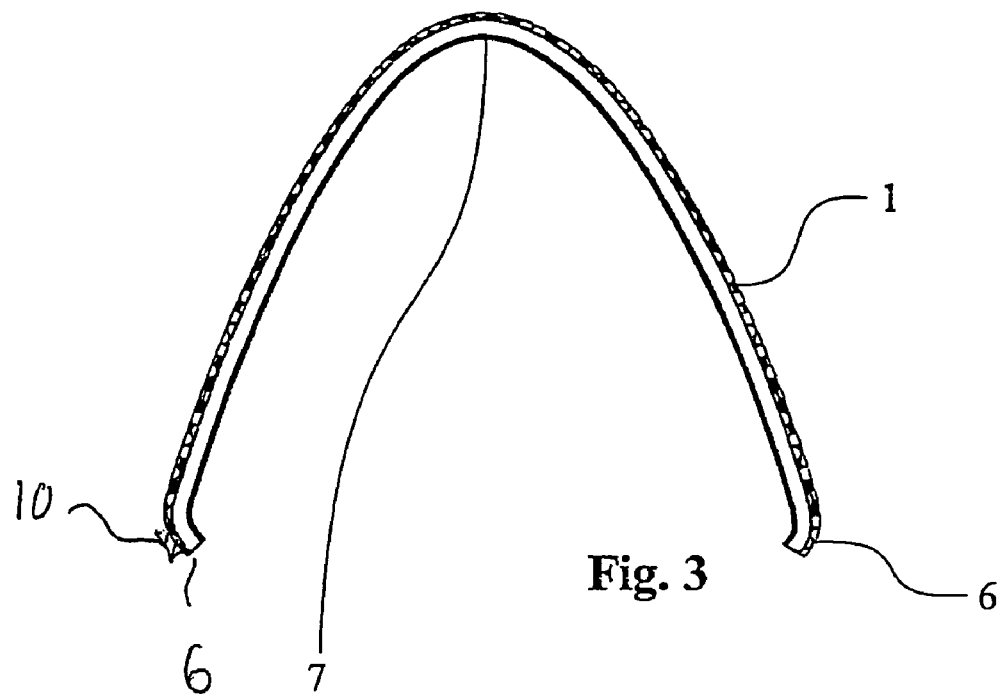
FIG. 3 shows in cross-section the shape of an edge part of a numnah according to the present invention.
Figure 4:
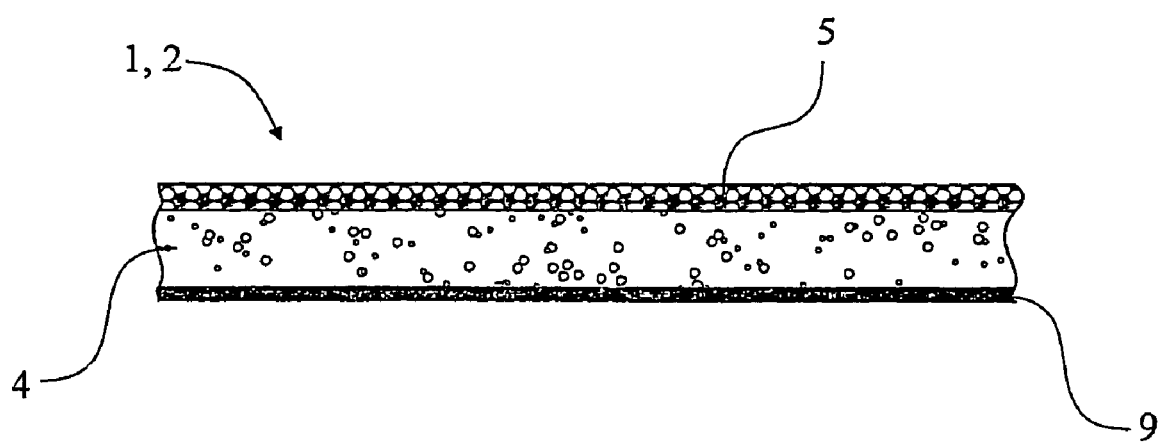
FIG. 4 is a schematic representation of a numnah made of Poliyou®

The numnah 1, 2 has an edge 6. The edge 6 may be provided with a decorative ribbon or strip 10 that is normally sewn to the edge 6 of the numnah 1, 2. The inventor has found that, during long term use of a numnah 1, 2, the edge 6 of the numnah can become folded upwards which causes the contact against the animal to deteriorate. To prevent this, the edge 6 or at least a part of the edge 6 can be curved inwards as indicated in FIG. 3. If the edge 6 is curved inwards, i.e. towards the animal 3 being ridden, one gains the advantage that the edge 6 will not so easily become folded upwards.

Figure 5:
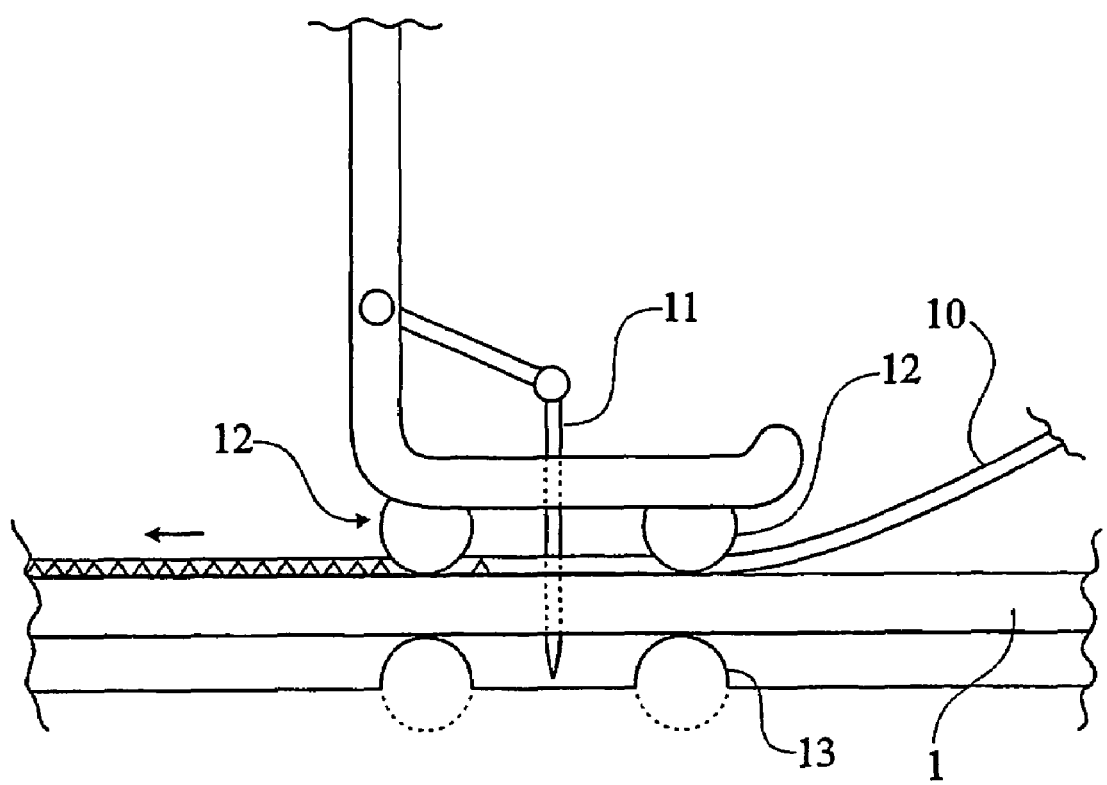
FIG. 5 is a schematic representation of a step in a possible method for manufacturing a numnah according to the present invention.

An alternative way of preventing that the edge 6 becomes folded upwards is disclosed in FIG. 5. The inventor has found that one reason that the edge 6 becomes folded upwards during long term use can be traced to the process where a decorative ribbon 10 is sewn to the edge 6 of the numnah 1, 2. Due to the thickness of the material used, the sewing process itself can cause the fabric of the material to become stretched in a way may contribute to make the edges become folded upwards. This can be counteracted if the decorative ribbon 10 is sewn to the edge by means of a sewing machine using feeder elements on both sides of the fabric. In FIG. 5, a sewing machine and a sewing process is illustrated where a decorative ribbon 10 is sewn to the edge 6 of the numnah 1, 2 with a sewing machine having a needle 11. Upper feeder elements 12 and lower feeding elements 13, for example rollers, both act to feed the fabric forward. In this way, the risk that the edges will fold upwards can be reduced. It should thus be understood that the invention may be described in terms of a method for making a numnah 1, 2. The method includes the steps of providing a piece of Poliyou® material, shaping the piece of Poliyou® material (for example by cutting) into the shape of a numnah and sewing the edges with a sewing machine having upper and lower feeder elements 12, 13.

Thanks to the thickness of the inventive numnah in combination with a hardness in the range of 25–35 (Asker C), a very even distribution of pressure can be achieved.

The invention claimed is:

1. A numnah for interposition between a saddle and an animal to be ridden, the numnah comprising:
    a first layer comprising a base layer having an open cell structure, wherein the base layer comprises a polyurethane foam and at least 50% recycle polyurethane foam, and the base layer having an Asker type C hardness in the range of 10 to 35and a water absorption capacity of at least 300% of its own weight; and
    a second layer disposed adjacent to the first layer, the second layer being in the form of a cover fabric having an open structure constructed and arranged to be applied against the back of the animal to be ridden, wherein the numnah has a thickness in the range of 2 to 20 mm.

2. A numnah according to claim 1, wherein the base layer has a water absorption capacity of at least 320% of its own weight.

3. A numnah according to claim 1, wherein the base layer has a water absorption capacity of at least 500% of its own weight.

4. A numnah according to claim 3, wherein the base layer contains activated carbon.

5. A numnah according to claim 3, wherein the base layer has an air permeability of 150–300 $l/m^2sec$.

6. A numnah according to claim 3, wherein the numnah has an edge and at least a part of the edge is curved inwards.

7. A numnah according to claim 3, wherein the base layer consists of a Poliyou® foam.

8. A numnah according to claim 1, wherein the base layer contains activated carbon.

9. A numnah according to claim 8, wherein the base layer has an air permeability of 150–300 $l/m^2sec$.

10. A numnah according to claim 8, wherein the numnah has an edge and at least a part of the edge is curved inwards.

11. A numnah according to claim 8, wherein the base layer consists of a Poliyou® foam.

12. A numnah according to claim 1, wherein the base layer has an air permeability of 150–300$l/m^2sec$.

13. A numnah according to claim 12, wherein the numnah has an edge and at least a part of the edge is curved inwards.

14. A numnah according to claim 12, wherein the base layer consists of a Poliyou® foam.

15. A numnah according to claim 1, wherein the numnah has an edge and at least a part of the edge is curved inwards.

16. A numnah according to claim 15, wherein the base layer consists of a Poliyou® foam.

17. A numnah according to claim 1, wherein the base layer consists of a Poliyou® foam.

18. A numnah according to claim 1, further comprising a thin outer layer disposed adjacent to the first layer.

19. A numnah for interposition between a saddle and an animal to be ridden, the numnah comprising:
    a first layer comprising a base layer having an open cell structure, wherein the base layer comprises a polyurethane foam and at least 50% recycle polyurethane foam, and the base layer having an Asker type C hardness in the range of 10 to 35, a permeability to air of 150 to 300 $l/m^2sec.$, and a water absorption capacity of at least 300% of its own weight;
    a second layer disposed adjacent to the first layer, the second layer being in the form of a cover fabric having an open structure constructed and arranged to be applied against the back of the animal to be ridden, wherein the numnah has a thickness in the range of 2 to 20 mm; and
    an outer layer disposed adjacent to the first layer and facing outward from an animal when used on the animal, wherein at least a part of an edge of the numnah is curved inwards to prevent the numnah from becoming folded upwards during use on the animal.

20. A numnah for interposition between a saddle and an animal to be ridden, the numnah comprising:
    a first layer comprising a base layer having an open cell structure, wherein the base layer comprises a polyurethane foam and at least 50% recycle polyurethane foam, and the base layer having an Asker type C hardness in the range of 10 to 35, a permeability to air of 150 to 300 $l/m^2sec.$, and a water absorption capacity of at least 300% of its own weight;
    a second layer disposed adjacent to the first layer, the second layer being in the form of a cover fabric having an open structure constructed and arranged to be applied against the back of the animal to be ridden, wherein the numnah has a thickness in the range of 2 to 20 mm; and
    an outer layer disposed adjacent to the first layer and facing outward from an animal when used on the animal; and
    a ribbon sewn to an edge of the numnah by means of a sewing machine using feeder elements on both sides of the ribbon to prevent the numnah from becoming folded upwards during use on an animal.

* * * * *